Sept. 17, 1929.         G. R. MAUPIN         1,728,499
METHOD OF SECURING BUSHINGS AND TOOL THEREFOR
Filed May 23, 1927
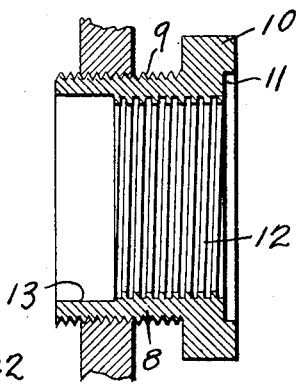
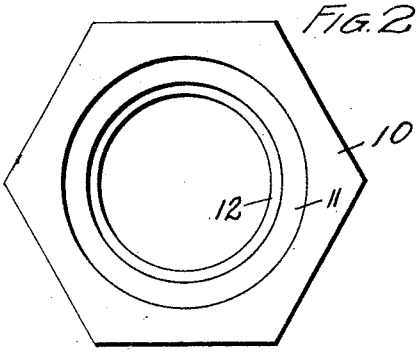
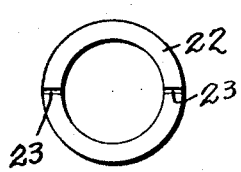
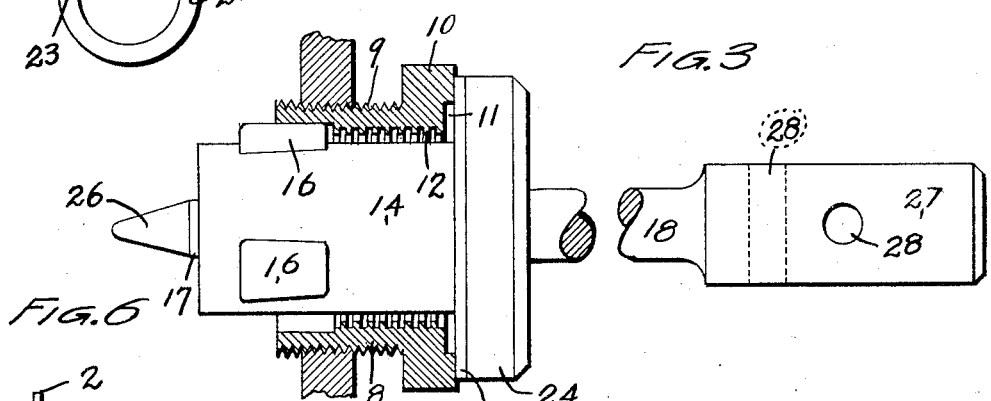
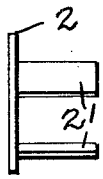
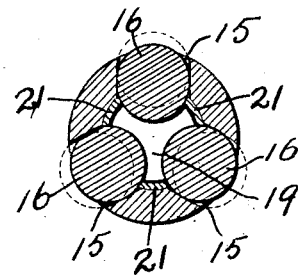
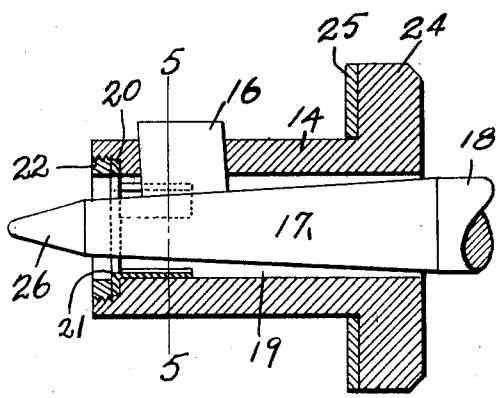
INVENTOR
GRAVES R. MAUPIN
By Edward E. Longan
ATTY.

Patented Sept. 17, 1929

1,728,499

UNITED STATES PATENT OFFICE

GRAVES R. MAUPIN, OF MOBERLY, MISSOURI, ASSIGNOR TO THE J. FAESSLER MANUFACTURING COMPANY, A COPARTNERSHIP COMPOSED OF JOHN W. FAESSLER, CHRISTINIA FAESSLER, LOUIS E. FAESSLER, AND GRAVES R. MAUPIN, OF MOBERLY, MISSOURI

METHOD OF SECURING BUSHINGS AND TOOL THEREFOR

Application filed May 23, 1927. Serial No. 193,460.

My invention relates to improvements in method of securing bushings and tool therefor, and has for its primary object a washout pushing which is so constructed that it can be readily inserted or screwed into a boiler sheet, water leg and the like, at the necessary points and which when so inserted is designed to have its inner end slightly expanded so that it will be firmly seated and all possibility of leakage along or around its outside face is eliminated.

A further object is to construct a tool by means of which the inner end of the bushing can be expanded.

A further object is to construct a tool for and a method of seating my improved bushing which is of the roller expanding type and which is so constructed that it can only be inserted a predetermined distance in the bushing and when so inserted all longitudinal movement thereof be prevented while the expanding is taking place.

In the drawings:

Fig. 1 is a fragmental section of a boiler sheet with my improved bushing in position;

Fig. 2 is a front view of the same;

Fig. 3 is a view similar to Fig. 1 showing the expanding tool in position and the bushing after it has been seated;

Fig. 4 is a vertical longitudinal section of the expander head and a portion of the mandrel.

Fig. 5 is a cross section taken on the line 5—5 of Fig. 4 with the mandrel removed;

Fig. 6 is a side view of the roller retainer employed in the cage for holding the rollers against complete collapse when the mandrel is removed; and Fig. 7 is a face view of the nut employed to hold the retainer in position.

In carrying out my invention I employ a bushing having a cylindrical portion 8. This cylindrical portion is screw threaded on the outside as indicated by the numeral 9. The outer end of the cylindrical portion 8 is provided with a head 10. This head may be either polygonal as illustrated or it may be made round. The face of the head 10 is recessed as at 11 to form a seat for a gasket carried by the washout plug not shown.

The cylindrical portion 8 is also provided with a concentric bore in which screw threads 12 are formed. These screw threads extend from the recess or counterbore 11 rearward for a predetermined distance. The remainder of the bushing is counter-bored as at 13 so as to make a smooth surface.

The tool employed in rolling in the bushing consists of a head or cage 14 which is provided with radial slots 15. In these slots are mounted rollers 16. These rollers are tapered as illustrated in Fig. 4 so that they can easily ride upon the tapered portion 17 of the mandrel 18 and while riding upon this tapered portion will bear throughout their length thereon but be so projected from the cage that their outer or projecting portion is parallel to the axis of the cage and the bushing. The cage is provided with a central bore 19 through which the mandrel 18 extends. One end of the cage is provided with a recess 20 in which the roller retainer 21 is seated. This roller retainer is provided with projections as illustrated in Figs. 4 and 6, which projections are so spaced apart as to be slightly closer together than the diameter of the rollers thereby preventing the rollers from passing entirely through the space between the projections.

The roller retainer 21 is held in position by means of a screw threaded collar or nut 22. This nut is provided on its outer face with slots or recesses 23. These recesses are preferably diametrically opposite each other so that the blade of a screw driver can be inserted and the nut seated.

Integral with the opposite end of the cage 14 is a collar or flange 24 which acts as a stop for the cage and limits its insertion in the bushing and in order to prevent the collar 24 from rubbing on the face of the head 10 a washer 25 is employed. This washer may be of fibre, brass or similar material, and fits loosely on the cage so that the flange or collar can move freely thereon when the device is in use, the collar remaining stationary and taking all of the wear thereby preventing any scoring or scratching of the head 10.

The forward end of the mandrel is provided with a conical point 26 which permits its ready insertion into the cage and between the rollers when they are fully collapsed. The opposite end of the mandrel 18 is provided with a head 27. This head is provided with openings 28 for the insertion of a bar by means of which the mandrel can be rotated.

The operation of the device is as follows: The bushing is first screwed into position as illustrated in Fig. 1. The mandrel 18 is then removed from the cage permitting the rollers to collapse. The cage is then introduced into the bushing as far as the flange 24 and collar or washer 25 will permit. The mandrel is then inserted and the rollers forced outward so that they will contact with the periphery of the counter-bore 13. The head 27 of the mandrel is then tapped lightly with a hammer and simultaneously with the tapping the mandrel is rotated by means of a bar inserted in one of the openings 28. This causes the rollers to rotate and in so doing causes the rollers to travel around the counter-bore 13 and due to the taper 17 on the mandrel 18, the rollers 16 will gradually be forced outward radially thereby expanding the rear portion of the bushing and tightly seating that portion which is in engagement with the threads in the boiler plate while that portion, which projects beyond, is slightly enlarged (see Fig. 3), thereby tightly securing the bushing in position. This enlarging, however, is not so extreme as to prevent the bushing from being removed when desired but still will be great enough to prevent the bushing from loosening in any manner.

Heretofore bushings of this type were secured by screwing them in position and then either with a welding torch or with an electric device, the bushing was welded in place in order to make a leak-tight joint. This was quite an expensive operation and when a bushing had to be removed, all of the metal deposited during the welding had to be chipped off, a long drawn-out and expensive operation. My improved bushing and the tool for seating it eliminates all this, as a bushing can be quickly inserted and seated so as to be absolutely leak-tight and still at the same time permit its removal without any expensive operation.

It will also be noted from Figs. 1 and 3 that the thickness of the wall of the counter-bored portion of the cylindrical member 8 is less than the portion which has the screw threads 12 therein. This permits the counter-bored portion of the bushing to be expanded readily and without danger of mutilating the threads 12 or distorting them.

I may also, if desired, give the rollers 16 a greater taper than shown in Figs. 3 and 4 so that when the implement is used, the end of the bushing projecting through the plate will be flared outwardly in addition to having the bushing expanded in the boiler plate.

Having fully described my invention, what I claim is:—

1. A tool for securing bushings in boiler plates and the like comprising a cage, expanding rollers mounted in the cage, a collar carried by and at one end of said cage, a thrust ring carried by the cage and adjacent the collar, a roller retainer carried by the forward end of the cage, means for securing the roller retainer in position, and a smooth removable tapering mandrel provided with a relatively sharp tapering point extending through said cage, said mandrel adapted to contact with and separate said rollers when in collapsed position and then gradually feed them outward as the mandrel is fed through said cage.

2. A tool for securing bushings in boiler plates and the like comprising a cage, tapering expanding rollers mounted in the cage, a collar formed integral with said cage at one end, a thrust ring mounted on the cage and contacting with the collar, a roller retainer carried by and within the forward end of the cage, means for securing the roller retainer in position, and a removable tapering mandrel provided with a tapering sharp point extending through said cage, said mandrel adapted to contact with and separate said rollers when in collapsed position so as to force them outward and then gradually feed them outward as the mandrel is fed through said cage.

3. The method of securing washout bushings and the like in boiler plates and the like, which consists in forming a screw threaded opening through said plate, inserting an externally and internally screw threaded bushing in said opening, applying outwardly directed rolling pressure to the rear end of said bushing for expanding a portion of the wall thereof and tightly seating it in the plate.

4. The method of securing washout bushings and the like in boiler plates and the like, which consists in forming a screw threaded opening through said plate, inserting an externally and internally screw threaded bushing in said opening, applying outwardly directed rolling pressure to a portion of said bushing for expanding the wall thereof and tightly seating said expanded portion in the plate.

5. The method of securing washout bushings and the like in boiler plates and the like which consists in forming a screw threaded opening through said plate, inserting an externally and internally screw threaded bushing in said opening, applying rolling pressure to the interior surface of the bushing adjacent its rear end for tightly seating the bushing in said plate and simultaneously enlarging the rear end of said bushing.

6. A tool for securing washout bushings and the like in boiler plates and the like comprising a cylindrical cage provided at one end with an integrally formed outwardly extending flange, an opening concentric with and extending through said cage, a plurality of openings formed in the cage intermediate its ends and communicating with the central opening, said openings extending parallel to the axis of the cage, tapered rollers mounted in said openings, means located within the forward end of the cage for limiting the inward movement of said rollers, a mandrel removably extending through said cage, said mandrel having a tapered portion adapted to bear against said rollers and thrust the same outward and being provided with a conical tip whereby said mandrel can be withdrawn entirely and readily inserted in the cage and between the rollers when the same are in collapsed position for forcing same outward, an enlargement carried by the opposite end of said mandrel, said enlargement having diametrically extending openings therethrough for the insertion of a tool whereby said mandrel can be turned, and a thrust collar loosely located on said cage and contacting with the flange.

7. The method of securing washout bushings and the like in boiler plates and the like, which consists in forming a screw threaded opening through said plate, inserting an externally screw threaded bushing in said opening so that the bushing will project slightly beyond the inner face of said plate, applying outwardly directed rolling pressure to that part of the bushing and parallel to its axis which has been inserted in the plate for expanding the same and tightly seating said bushing in the screw threaded opening, and simultaneously therewith forcing the projecting end of the bushing on the inside of said plate outwardly.

In testimony whereof I have affixed my signature.

GRAVES R. MAUPIN.